US012155808B2

(12) United States Patent
Chupeau et al.

(10) Patent No.: US 12,155,808 B2
(45) Date of Patent: Nov. 26, 2024

(54) MULTIVIEW MULTISCALE METHODS AND APPARATUS FOR VIEW SYNTHESIS

(71) Applicant: INTERDIGITAL CE PATENT HOLDINGS, SAS, Paris (FR)

(72) Inventors: Bertrand Chupeau, Rennes (FR); Tomas Volker, Buenos Aires (AR); Guillaume Boisson, Pleumeleuc (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 254 days.

(21) Appl. No.: 17/642,084

(22) PCT Filed: Sep. 10, 2020

(86) PCT No.: PCT/EP2020/075325
§ 371 (c)(1),
(2) Date: Mar. 10, 2022

(87) PCT Pub. No.: WO2021/048276
PCT Pub. Date: Mar. 18, 2021

(65) Prior Publication Data
US 2023/0308621 A1  Sep. 28, 2023

(30) Foreign Application Priority Data

Sep. 13, 2019 (EP) .................................. 19306107

(51) Int. Cl.
*H04N 13/111* (2018.01)
*G06T 3/40* (2024.01)
(Continued)

(52) U.S. Cl.
CPC .............. *H04N 13/111* (2018.05); *G06T 3/40* (2013.01); *G06T 7/90* (2017.01); *G06V 10/44* (2022.01);
(Continued)

(58) Field of Classification Search
CPC .... H04N 13/111; H04N 19/30; H04N 19/186; H04N 19/597; G06T 3/40; G06T 7/90;
(Continued)

(56) References Cited

U.S. PATENT DOCUMENTS 9,968,257 B1 * 5/2018 Burt ..................... A61B 5/0035
2018/0293774 A1 * 10/2018 Yu ........................... G06T 15/06
(Continued)

OTHER PUBLICATIONS

Rosas-Romero et al, "Fully Automatic Alpha Matte Extraction using Artificial Neural Networks", Neural Computing and Applications, Springer-Verlag London Ltd., vol. 32, No. 11, Mar. 21, 2019 14 pages.

(Continued)

*Primary Examiner* — Tung T Vo
(74) *Attorney, Agent, or Firm* — Condo Roccia Koptiw LLP

(57) ABSTRACT

The present disclosure relates to method and apparatus for the estimation of an accurate multiplane image from a set of posed images. The accuracy of an MPI representation is measured by the performance of the views generated by it through inverse homography sampling and alpha compositing. A variable number of posed images at a possibly different resolution representative of scenes with arbitrary geometry are used as input of the system. A first level of three modules, possibly trained based on deep learning methods, is built for extracting view and scene features and color scores. Numerous levels of the same three modules may be built and organized in a structure where a level deals with down-scaled version of the posed images.

8 Claims, 4 Drawing Sheets

(51) Int. Cl.
*G06T 7/90* (2017.01)
*G06V 10/44* (2022.01)
*G06V 10/56* (2022.01)

(52) U.S. Cl.
CPC .... *G06V 10/56* (2022.01); *G06T 2207/10024* (2013.01)

(58) Field of Classification Search
CPC . G06T 2207/10024; G06T 7/75; G06T 15/10; G06V 10/44; G06V 10/56; G06N 3/084; G06N 3/045
USPC .......................................................... 348/43
See application file for complete search history.

(56) References Cited

U.S. PATENT DOCUMENTS

| | | | |
|---|---|---|---|
| 2020/0011668 A1* | 1/2020 | Derhy | G06T 7/579 |
| 2020/0137380 A1* | 4/2020 | Supikov | G06N 3/063 |
| 2020/0228774 A1* | 7/2020 | Kar | H04N 13/111 |

OTHER PUBLICATIONS

Flynn et al, "DeepView: View Synthesis with Learned Gradient Descent", Institute of Electrical and Electronics Engineers, 2019 IEEE/CVF Conference on Computer Vision and Pattern Recognition (CVPR), Long Beach, California, USA, Jun. 15, 2019, 10 pages.

Zhou et al, "Stereo Magnification: Learning View Synthesis using Multiplane Images", Association for Computing Machinery, ACM Transactions on Graphics, vol. 37, Issue 4, Article 65, Aug. 2018, 12 pages.

Mildenhall et al, "Local Light Field Fusion: Practical View Synthesis with Prescriptive Sampling Guidelines", Association for Computing Machinery, ACM Transactions on Graphics, vol. 38, No. 4, Article 29, Jul. 2019, 14 pages.

Srinivasan et al., "Pushing the Boundaries of View Extrapolation with Multiplane Images", Institute of Electrical and Electronics Engineers, 2019 IEEE/CVF Conference on Computer Vision and Pattern Recognition (CVPR), Long Beach, California, USA, Jun. 15, 2019, 10 pages.

* cited by examiner

MULTIVIEW MULTISCALE METHODS AND APPARATUS FOR VIEW SYNTHESIS

CROSS REFERENCE TO RELATED APPLICATIONS

This application is a U.S. National Stage Application under 35 U.S.C. 371 of International Patent Application No. PCT/EP2020/075325, filed Sep. 10, 2020, which is incorporated herein by reference in its entirety.

This application claims the benefit of European Patent Application No. 19306107, filed Sep. 13, 2019, which is incorporated herein by reference in its entirety.

TECHNICAL FIELD

The present principles generally relate to the domain of three-dimensional (3D) scene and volumetric video content, for example, light field images. The present document is also understood in the context of the encoding of a volumetric content from a set of posed images by using a multiplane image representation.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the context of three-dimensional (3D) scene and volumetric video content, the need for generating views from a set of posed images rises as a necessary step for volumetric content rendering. Particularly in the case of real scenes captured by camera arrays. A common step in view synthesis is the need to estimate the scene geometry from images captured from a set of available viewpoints. Different representations for the scene can be used such as depth maps or volumetric images sampled with different strategies according to the application. Some techniques such as Local Light Field Fusion make use of a Multiplane Image (MPI) as a scene representation consisting of a stack of RGB+alpha images at different depths. Systems outputting an accurate MPI representation of the scene from a set of posed images have limiting features. For example, the number, the order and the resolution of the posed images is predetermined. There is a lack for a system allowing the estimation of an accurate MPI scene representation given a set of posed images from a variable number of views at a variable resolution on scenes with arbitrary geometry.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method for generating a multiplane image from a set of posed images, the method comprising:
operating a first level of three modules,
a first module being operated to extract view features from said set of posed images,
a second module being operated to extract scene features of said set of posed images by using a result of the operating of said first module, and
a third module being operated to extract color scores of said set of posed images by using said result of the operating of the first module and a result of the operating of said second module; and
generating said multiplane image comprising
an alpha component determined as a function of the result of the operating of the second module, and
a color component determined by normalizing the result of the operating of the third module.

According to a particular embodiment, the method also comprises operating a second level of said three modules, wherein:
the posed images in input of the modules of said second level are downscaled by a factor; and
the results operated by the modules of said second level are upscaled by said factor and are used in input of corresponding modules of said first level.

The present principles also relate to device for generating a multiplane image from a set of posed images, the device comprising a processor configured for:
operating a first level of three modules,
a first module being operated by said processor to extract view features from said set of posed images,
a second module being operated by said processor to extract scene features of said set of posed images by using a result of operating of said first module, and
a third module being operated by said processor to extract color scores of said set of posed images by using said result of the operating of the first module and a result of operating of the said second module; and
generating said multiplane image comprising
an alpha component determined as a function of the result of the operating of the second module, and
a color component determined by normalizing the result of the operating of the third module.

And, in a particular embodiment, the processor is further configured for operating a second level of said three modules, wherein:
the posed images in input of the modules of said second level are downscaled by a factor; and
the results operated by the modules of said second level are upscaled by said factor and are used in input of corresponding modules of said first level.

The present principles also relate to a method of training a system configured for generating a multiplane image from a set of first posed images, the method comprising:
operating a first level of three modules,
a first module being operated to extract view features from said set of first posed images,
a second module being operated to extract scene features of said set of first posed images by using a result of the operating of said first module, and
a third module being operated to extract color scores of said set of first posed images by using said result of the operating of the first module and a result of the operating of said second module; and generating said multiplane image comprising
    an alpha component determined as a function of the result of the operating of the second module, and
    a color component determined by normalizing the result of the operating of the third module,
generating a second posed image for a viewpoint from said multiplane image,
back-propagating a gradient descent in said three modules by comparing said second posed image with a third posed image captured at said viewpoint.

In an embodiment, the method comprises operating a second level of said three modules, wherein:
    the posed images in input of the modules of said second level are downscaled by a factor; and
    the results of the operating of the modules of said second level are upscaled by said factor and are used in input of corresponding modules of said first level.

The present principles also relate to a device for training a system configured for generating a multiplane image from a set of first posed images, the device comprising a processor configured for:
    operating a first level of three modules,
        a first module being operated to extract view features from said set of first posed images, a second module being operated to extract scene features of said set of first posed images by using a result of the operating of said first module, and
        a third module being operated to extract color scores of said set of first posed images by using said result of the operating of the first module and a result of the operating of said second module; and
    generating said multiplane image comprising
        an alpha component determined as a function of the result of the operating of the second module, and
        a color component determined by normalizing the result of the operating of the third module,
    generating a second posed image for a viewpoint from said multiplane image,
    back-propagating a gradient descent in said three modules by comparing said second posed image with a third posed image captured at said viewpoint.

In an embodiment, the processor is further configured for operating a second level of said three modules, wherein:
    the posed images in input of the modules of said second level are downscaled by a factor; and
    the results of the operating of the modules of said second level are upscaled by said factor and are used in input of corresponding modules of said first level.

BRIEF DESCRIPTION OF DRAWINGS

The present disclosure will be better understood, and other specific features and advantages will emerge upon reading the following description, the description making reference to the annexed drawings wherein.

DETAILED DESCRIPTION OF EMBODIMENTS

Figure 1A:
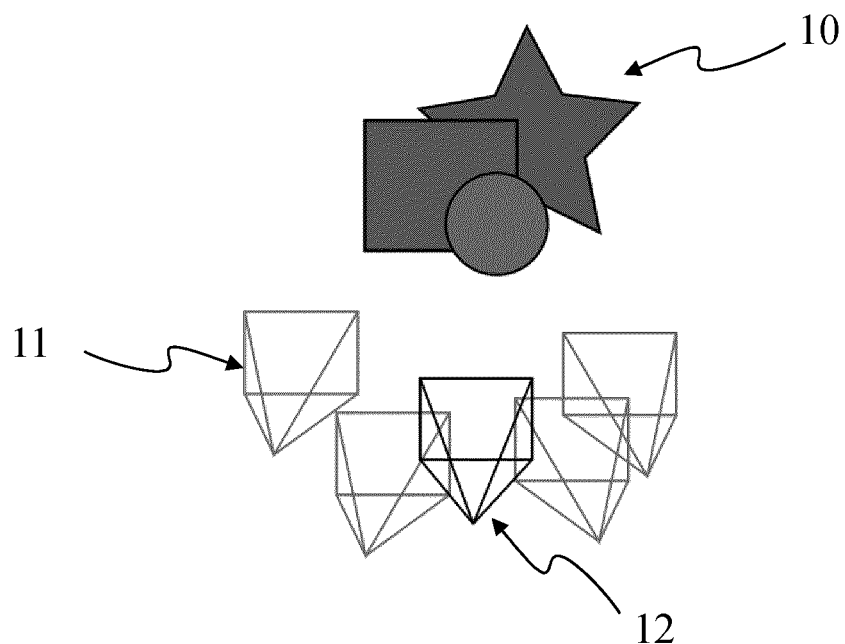
FIGS. 1A and 1B illustrate the pose estimation problem.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved. Blocks may also be designated as modules or boxes.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

Figure 1B:
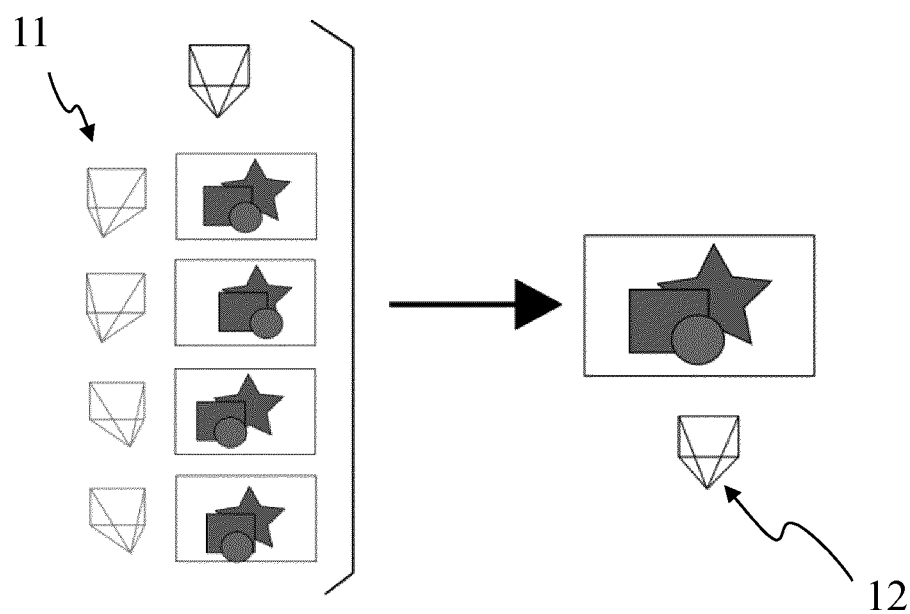

FIGS. 1A and 1B illustrate the pose estimation problem. A scene 10 is captured by a set 11 of cameras from different viewpoints. The number of cameras in set 11 may vary. The resolution of each camera may be different. The pose estimation problem consists in generating a new image, as if it has been captured by a camera 12 at a pose (i.e. the location and the orientation in the 3D space of the scene) different from the viewpoints of the cameras of set 11. For generating such a new view of the scene, the scene geometry is estimated from the available views from set 11 and the new view is generated by projecting the retrieved geometry on the image plane of the new view as a function of the pose of its virtual camera 12.

Figure 2:
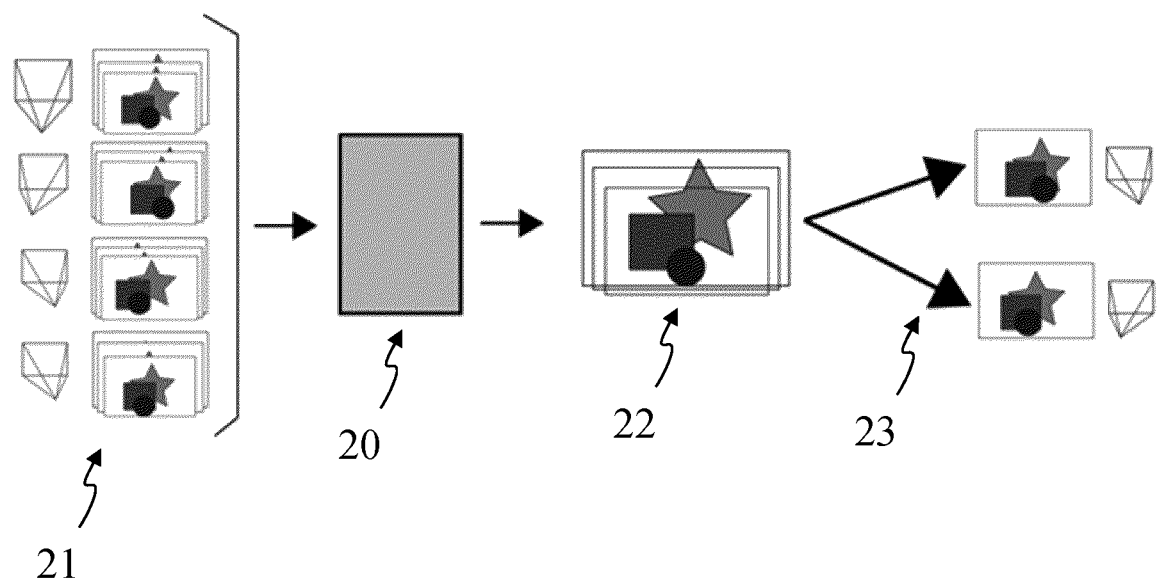
FIG. 2 diagrammatically shows a system for generating a view from a set of posed views, according to a non-limiting embodiment of the present principles.

FIG. 2 diagrammatically shows a system 20 for generating a view from a set of posed views 21. System 20 takes a set 21 of views from different cameras as input and generates a representation 22 of the scene. This representation may be encoded, stored in a local or remote memory and/or transmitted as a data stream to a distant device. A process 23 uses representation 22 to interpolate views from any pose of a virtual camera within a part of the 3D space of the 3D scene. This part of the 3D space is determined according to the pose of the available viewpoints in set 21. Indeed, generating a view for a camera outside this part of the 3D space may lead to an image with missing pixel information as this information has not been captured by the cameras of set 21.

Different representations for the scene may be used such as depth maps or volumetric images sampled with different strategies (e.g. patch atlases). Multiplane Image (MPI), as a scene representation 22, is an efficient way to encode a 3D scene for optimizing view interpolation process 23. A MPI consists in a stack of RGB+alpha images at different depths. MPI representation is efficiently used in different existing systems, for instance, for view interpolation or extrapolation of stereo pairs. System 20 may generate a MPI representation 22 from a set of views 21 by using Deep Learning techniques. The input views are preprocessed to build Plane Sweep Volumes (PSV) before being processed by the trainable encoder 20. A PSV is built by warping the image from the input view to the MPI's reference camera through different depth planes. A PSV is built per input view. The ensemble of views forms a PSV Stack.

The PSV Stack is input to the trainable MPI estimator 20 to generate the MPI 22 which is further used to synthesize 23 a set of target viewpoints through inverse homography sampling and alpha compositing. Ground truth images captured at those positions are compared to the synthesized ones with an error metric. As the whole procedure is differentiable, the error is minimized by a gradient descent algorithm that modifies the MPI estimator's parameters.

Regarding the architecture of the MPI estimator, existing systems make use of a U-net like Convolutional Neural Network (CNN) with small variations on the input, output and layer dimensions. A U-net architecture consists in an encoder-decoder like network with skip connections and a bottleneck with small spatial dimensions and large number of channels. Such an architecture has serious limitations for addressing an input set of views comprising a variable number of posed images have different resolutions. First, it can only process a fixed number of views predefined by the architecture without the possibility to change it after training. This is because the PSVs of the different inputs are concatenated on the channel dimension of the input tensor. Secondly, a U-net approach does not exploit the scale-equivariance of the problem with some kind of multiscale strategy, potentially requiring more data than needed to train and not generalizing well on resolution. The present principles address these two aspects.

Figure 3:
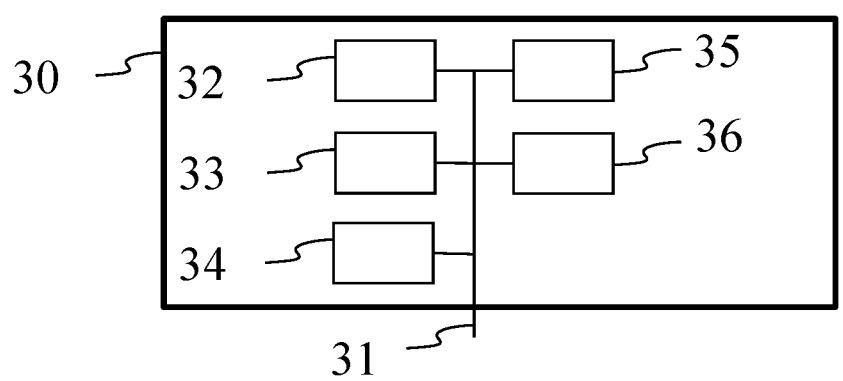
FIG. 3 shows an example architecture of a device which may be configured to implement a method described in relation with FIGS. 6 and 7, according to a non-limiting embodiment of the present principles.
Figure 6:
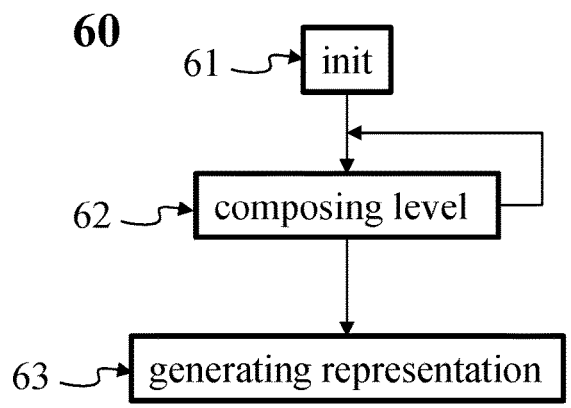
FIG. 6 illustrates a method for generating a multiplane image from a set of posed images, according to a non-limiting embodiment of the present principles.
Figure 7:
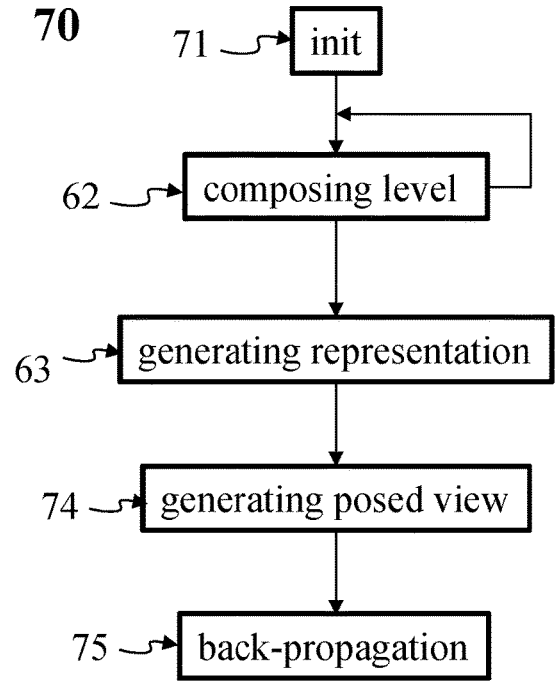
FIG. 7 illustrates a method of training a system configured for generating a multiplane image from a set of first posed images, according to a non-limiting embodiment of the present principles.

FIG. 3 shows an example architecture of a device 30 which may be configured to implement a method described in relation with FIGS. 6 and 7. Encoder 20 of FIG. 2 may implement this architecture. Alternatively, each circuit of encoder 20 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word <<register>> used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 6 and 7, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
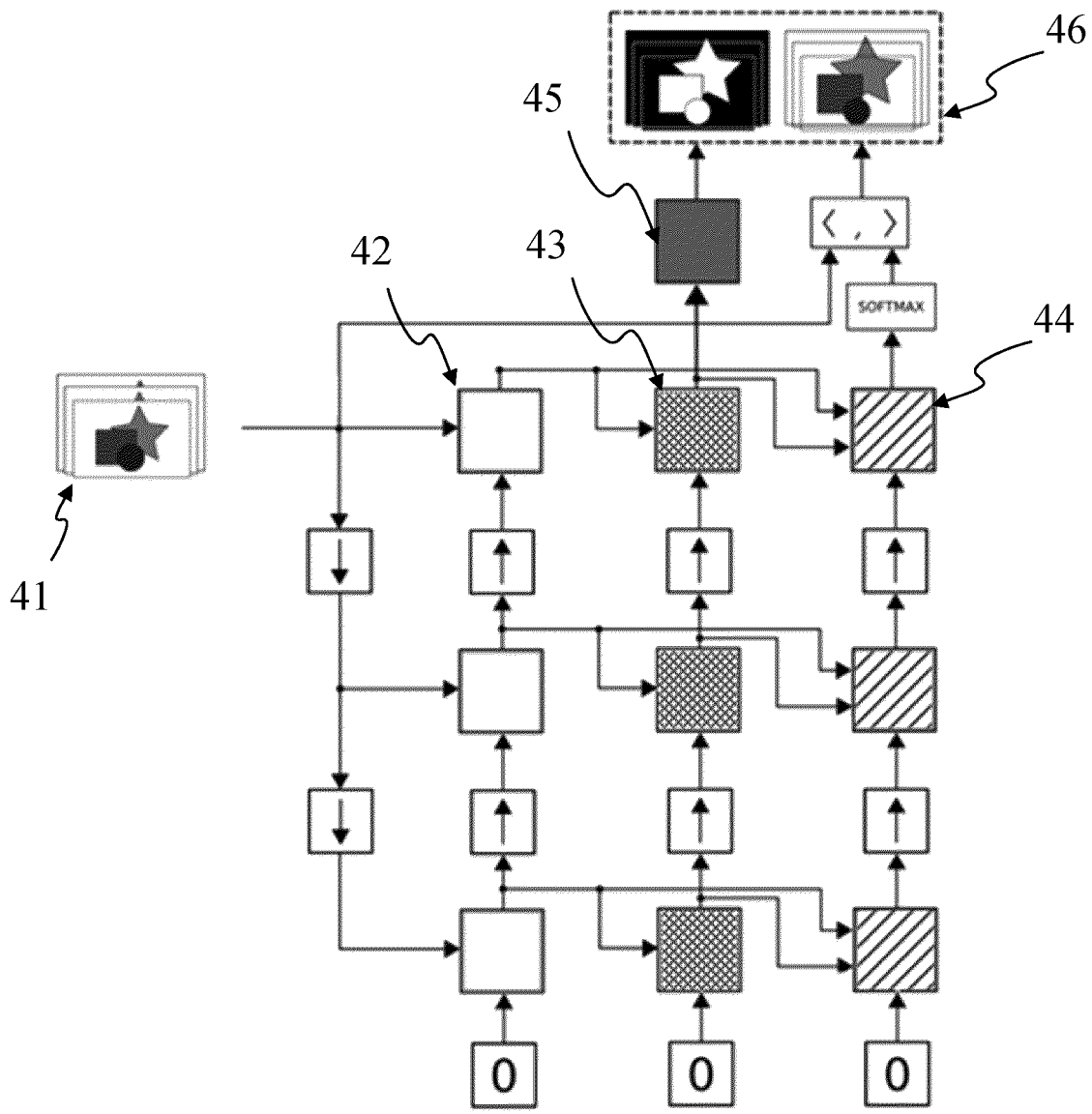
FIG. 4 diagrammatically schematizes a Deep Learning architecture of a system trained for multiplane image generation from a set of posed images as illustrated in FIG. 2, according to a non-limiting embodiment of the present principles.

FIG. 4 diagrammatically schematizes a Deep Learning architecture of a system trained for MPI generation from a set of posed images as illustrated in FIG. 2. The architecture comprises three types of modules 42, 43 and 44. A module 42, 43 or 44 is a submodel in the learning-based architecture according to the present principles. These three types of modules are defined by the intermediate values they convey in the model and according to the role these intermediate value play in the estimation.

It is possible to distinguish:
- "view encoding" as a volume with a number VC of channels computed from a single PSV representing the learned relevant data extracted from a view,
- "scene encoding" a volume with a number SC of channels computed from a set of view encodings representing the learned relevant data about the scene,
- "color score" a volume of scalar values computed from a view encoding and a scene encoding indicating the likelihood that the given voxel has the color of the given view.

A module 42 (white in FIG. 4) is a part of a View Encoder: A module 42 is a 3D convolutional neural network (CNN) model that inputs a PSV and a previous view encoding and outputs an updated view encoding. A module 43 (filled with dots in FIG. 4) is a part of a Scene Encoder: A 3D CNN model that inputs a set of view encodings and a previous scene encoding and outputs an updated scene encoding. And a module 44 (hatched in FIG. 4) is a part of a Color Selector: A 3D CNN model that inputs a view encoding, a scene encoding and a previous color score volume and outputs an updated color score volume.

First, PSV Stack 41 is successively subsampled on the spatial dimensions by a given factor f (for example 2 or 4). As an example, FIG. 4 shows three levels of modules. According to the present principles, the system comprises at least one level of module s and may comprises as much levels as required by the application. At each resolution, the PSV Stack is processed in parallel by the View Encoder module 42, processing each PSV independently. The View Encoder inputs the current level PSVs and the up-sampled view encodings for the previous level and outputs V view encodings. Theses view encodings are then input to the Scene Encoder module 43 which reduces them to a single scene encoding using the up-sampled scene encoding from the previous level. The view encodings and the scene encoding are later processed by the Color Selector module 44 which in parallel for each view outputs a color score volume. According to the present principles, the same model is applied at each resolution level. The parameters are shared at each level and the number of levels may be increased according to the application. This enables to generalize the feature extraction and processing at different resolutions.

At the lowest resolution (determined according to the application), the previous values for view encoding, scene encoding and color scores are set to a constant value (e.g. zero or 255) or to any signal that represents the absence of data (e.g. a white noise signal or a film grain signal). representing the absence of data. To build the MPI 46, an additional CNN model 45 processes the full resolution scene encoding into a single channel volume containing the resulting alpha values of the MPI. For the color component, the full resolution color scores are passed through a normalization operator (e.g. a normalized exponential function like the softmax operator) along the views, obtaining values from 0 to 1 that add up to 1, working as a selection mask. This selection mask is multiplied element-wise by the input PSVs and added up along the views, resulting on the RGB component of the MPI.

Figure 5:
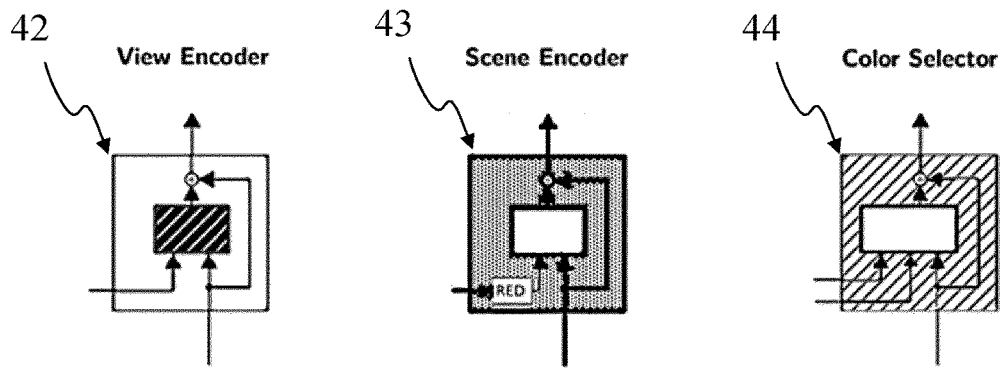
FIG. 5 shows a View Encoder, a Scene Encoder and a Color Selector 44, according to a non-limiting embodiment of the present principles.

FIG. 5 shows the View Encoder 42, Scene Encoder 43 and Color Selector 44 in detail. The three models are residual, meaning that they compute the value to be added to the up-sampled result of the previous level in FIG. 4. The View Encoder processes the V input PSVs independently through a 3D CNN. The Scene Encoder inputs the V view encodings and reduces them with a permutation invariant reduction such as "max" or "sum" and processes this value with a 3D CNN. The permutation invariant reduction allows the model to process a variable amount of views guaranteeing the same result if the views are input in a different order. The Color Selector inputs the view encodings, the scene encoding and the previous color scores, processing with a 3D CNN all the views independently to obtain V color score volumes.

Some of the advantages of this architecture are the following:
- This multiscale architecture exploits the scale equivariance of the PSV-MPI mapping with a variable number of resolution layers depending on the input image dimensions. This is achieved by processing the input PSV at different resolutions with the same model (e.g. using weight sharing) and combining results between resolutions during the process.
- This multiview architecture exploits the view permutation invariance of the PSV-MPI mapping. Permutation invariance is achieved by processing with the same model each view and later reducing the output values with a reduction operation that respects this property. The architecture also enables processing a variable number of input views while keeping the desired property.
- These two advantages are combined simultaneously: Both techniques to achieve scale equivalence and view permutation invariance are not applied sequentially but performed jointly. The intermediate results of the multiview architecture (view encoding, scene encoding and color score) are sent to higher resolution stages to be used on the estimation at higher levels, while at the same time used at the same level for later stages.

FIG. 6 illustrates a method 60 for generating a multiplane image from a set of posed images, according to a non-limiting embodiment of the present principles. At a step 61, a set of posed images is obtained. According to the present principles, there is no constraints on (1) the number of posed images in the set, on (2) their order in the set and on (3) their different resolutions. A pose of a virtual camera may be obtained to generate a view from this viewpoint from the generated multiplane image. At a step 62, a first level of modules is composed. The level comprises one item of the three modules described in relation to FIGS. 4 and 5: a view encoder, a scene encoder and a color selector. The three modules are connected as depicted in FIG. 4. The first module (i.e. the view encoder) extracts view features from the set of posed images; the second module (i.e. the scene encoder) extracts scene features of (and from) the set of posed images by using the output result of the first module; and the third module extracts color scores of (and from) the set of posed images by using the output results of the first module and of the second module. At this step a second level composed of the same three modules may be built and connected to the first level as described in relation to FIG. 4 via a down-scaling of the posed images by a given factor (e.g. 2, 4 or 6) and an up-scaling of the output results of the three modules. At a step 63, a multiplane image is generated by using the results of the second and third modules, results of the second module being used for generating the alpha component of the MPI and results of the third module being used for generating the color component of the MPI.

FIG. 7 illustrates a method 70 of training a system configured for generating a multiplane image from a set of first posed images, according to a non-limiting embodiment of the present principles. At a step 71, a set of posed images is obtained. One posed view, called second posed image, is extracted from the set to serve as ground truth data for the training of the system. The method may be iterated for each posed view in the set extracted as ground truth data. At this step, steps 62 and 63 of method 60 are performed in the same way. The modules are composed and connected in levels. A MPI is generated at step 63. The difference with method 60 is that, in method 70, the system may be not yet fully trained and, so, the generated MPI may be more or less representative of the geometry of the scene as captured by the posed view in the input set. At a step 74, the MPI is used to generate a view of the scene for a virtual camera having the pose of the camera with which the second posed image has been captured. Thus, at a step 75, the generated view is compared to the second posed image and a metric is computed. A gradient descent algorithm is applied to the parameters of the three modules to minimize the error of the system.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
operating a level of three convolutional network (CNN) modules:
a first CNN module being operated to extract view features from a set of posed images;
a second CNN module being operated to extract scene features of the set of posed images by using a result of the operating of the first CNN module; and
a third CNN module being operated to extract color scores of the set of posed images by using the result of the operating of the first CNN module and a result of the operating of the second CNN module; and
generating a multiplane image from the set of posed images, wherein a multiplane image is a stack of images comprising a color component and an alpha component, comprising, for each image of the stack:
the alpha component determined as a function of the result of the operating of the second CNN module; and
the color component determined by normalizing the result of the operating of the third CNN module.

2. The method of claim 1, further comprising operating a second level of the three CNN modules, wherein:
the posed images in input of the CNN modules of the second level are downscaled by a factor; and
the results operated by the CNN modules of the second level are upscaled by the factor and are used in input of corresponding CNN modules of the first level.

3. A device comprising a processor configured for:
operating a level of three CNN modules:
a first CNN module being operated by the processor to extract view features from a set of posed images;
a second CNN module being operated by the processor to extract scene features of the set of posed images by using a result of operating of the first CNN module; and
a third CNN module being operated by the processor to extract color scores of the set of posed images by using the result of the operating of the first CNN module and a result of operating of the second CNN module; and
generating a multiplane image from the set of posed images, wherein a multiplane image is a stack of images comprising a color component and an alpha component, comprising, for each image of the stack:
the alpha component determined as a function of the result of the operating of the second CNN module; and
the color component determined by normalizing the result of the operating of the third CNN module.

4. The device of claim 3, wherein the processor is further configured for operating a second level of the three CNN modules, wherein:
the posed images in input of the CNN modules of the second level are downscaled by a factor; and
the results operated by the CNN modules of the second level are upscaled by the factor and are used in input of corresponding CNN modules of the first level.

5. A method of training a system, the method comprising:
operating a level of three CNN modules:
a first CNN module being operated to extract view features from a set of first posed images;
a second CNN module being operated to extract scene features of the set of first posed images by using a result of the operating of the first CNN module; and
a third CNN module being operated to extract color scores of the set of first posed images by using the result of the operating of the first CNN module and a result of the operating of the second CNN module;
generating a multiplane image from the set of posed images, wherein a multiplane image is a stack of images comprising a color component and an alpha component, comprising, for each image of the stack:
the alpha component determined as a function of the result of the operating of the second CNN module; and
the color component determined by normalizing the result of the operating of the third CNN module;
generating a second posed image for a viewpoint from the multiplane image; and
back-propagating a gradient descent in the three CNN modules by comparing the second posed image with a third posed image captured at the viewpoint.

6. The method of claim 5, further comprising operating a second level of the three CNN modules, wherein:
the posed images in input of the CNN modules of the second level are downscaled by a factor; and
the results of the operating of the CNN modules of the second level are upscaled by the factor and are used in input of corresponding CNN modules of the first level.

7. A device for training a system, the device comprising a processor configured for:
operating a level of three CNN modules:
a first CNN module being operated to extract view features from a set of first posed images;
a second CNN module being operated to extract scene features of the set of first posed images by using a result of the operating of the first CNN module; and
a third CNN module being operated to extract color scores of the set of first posed images by using the result of the operating of the first CNN module and a result of the operating of the second CNN module;
generating a multiplane image from the set of posed images, wherein a multiplane image is a stack of images comprising a color component and an alpha component, comprising, for each image of the stack:
the alpha component determined as a function of the result of the operating of the second CNN module; and
the color component determined by normalizing the result of the operating of the third CNN module;
generating a second posed image for a viewpoint from the multiplane image; and
back-propagating a gradient descent in the three CNN modules by comparing the second posed image with a third posed image captured at the viewpoint.

8. The device of claim 5, wherein the processor is further configured for operating a second level of the three CNN modules, wherein:
the posed images in input of the CNN modules of the second level are downscaled by a factor; and
the results of the operating of the CNN modules of the second level are upscaled by the factor and are used in input of corresponding CNN modules of the first level.

* * * * *